Patented July 26, 1927.

1,636,855

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

PRODUCTION OF AROMATIC ALDEHYDES.

No Drawing.   Application filed November 18, 1921. Serial No. 516,124.

This invention relates to the production of aromatic aldehydes by catalytic oxidation in the vapor phase of the aliphatic side chain or side chains of aromatic hydrocarbons. It relates more specifically to the production of aromatic aldehydes from aromatic hydrocarbons characterized by the presence of at least one benzene nucleus, and in which aromatic hydrocarbon at least two hydrogen atoms have been substituted by other groups, at least one of which is an aliphatic group that may be oxidized to an aldehydic group. The ordinary procedures for the production of aromatic aldehydes have been through the chlorination of the side chains and the subsequent hydrolysis of the chlorinated products, by oxidation of the side chains by wet oxidation methods, by modifications of Gatterman's synthesis through carbon monoxide and hydrochloric acid or hydrocyanic acid and hydrochloric acid. I am aware of U. S. Patent No. 1,284,887, which claims the vapor phase oxidation of side chains by oxides of vanadium. The following description of my process will make clear the improvements of my invention over the previous processes.

I have discovered that metallic oxides differ very widely in their catalytic action at elevated temperatures on the aliphatic substituents of aromatic hydrocarbons and also on the aromatic nucleus itself. For example, ortho-xylene vapor when mixed with an oxygen-containing gas, air for instance, and this mixture passed over the oxides of vanadium gives phthalic acid anhydride, ortho-toluic aldehyde, maleic acids and a measurable amount of the products of complete combustion, i. e., carbon dioxide and water, these products being in the following proportions of 9.61:1.0:1.2:6.03 respectively, which are based on the relative amounts of these products formed in terms of pounds per 100 pounds of ortho-xylene passed over the catalyst. The production of phthalaldehyde was nil. But, however, if this same mixture be passed over uranium oxide, a large yield of ortho-toluic aldehyde results without any appreciable acid production or complete combustion. Similar results also hold true for molybdenum oxide, although the yield of ortho-toluic aldehyde is relatively somewhat lower. Furthermore, if a hydrocarbon, such as mesitylene which contains three methyl groups, be passed over vanadium oxide a considerable maleic acid production and complete combustion result with practically no aldehyde or other acid production, while if passed over uranium oxide under practically the same conditions, only the 1:3:5 dimethyl benzaldehyde (1 methyl, 3 methyl, 5 aldehyde) results in a measurable yield, with a negligible production of acid.

Likewise I have found that when a mixture of meta and para-xylenes is passed over molybdenum oxide or uranium oxide, a corresponding mixture of the toluic aldehydes with practically no acid production results, while when vanadium oxide is used as the catalyst, a measurable amount of maleic acid and the corresponding mixture of the toluic acids is produced along with a relatively small aldehyde production. Pseudocumene with uranium oxide, molybdenum oxide and tungstic oxide have been found to give the 1:2:4 dimethyl benzaldehyde (1 methyl, 2 methyl, 4 aldehyde) with a negligible acid formation, while with vanadium oxide, the production of phthalic anhydride to that of this aldehyde was in the ratio of 20.4:1 respectively.

Paracymene was found to give similar results with the oxides of the fifth and sixth groups, namely that with uranium oxide, p-toluic aldehyde was the principal product with a negligible p-toluic acid and maleic acid formation, while with vanadium oxide a considerable production of these acids was obtained with an accompanying relatively small p-toluic aldehyde formation.

I have also found that if chlorinated aromatic hydrocarbons are subjected to catalysis, the same general results hold true. For example, if a mixture of ortho-chlortoluene vapor and air be passed over a vanadium oxide catalyst, ortho-chlorbenzoic acid, o-chlorbenzaldehyde and maleic acid result, along with an accompanying measurable amount of the products of complete combustion, these products being in the proportions of 1.2:2.17:1.0:1.6 respectively, while if tantalum oxide is used as the catalyst in lieu of vanadium oxide, only ortho-chlorbenzaldehyde is obtained and this in a relatively much greater yield. The production of acid was found to be negligible as were also the products of complete combustion. Hydrochloric acid was, of course, produced in all cases in almost theoretical conformity with the products formed.

The wide variation in the catalytic action of vanadium oxide when compared with that of the other oxides of the fifth and sixth groups of the periodic system is likewise very strikingly exhibited with toluene. For example, toluene with vanadium oxide gives benzaldehyde, benzoic acid, maleic acid and a measurable amount of complete combustion, the proportions of these various products being as follows:—1:2.47:1.45:1.35 respectively, while I have found that when the oxides of molybdenum, uranium, tungsten, tantalum and chromium are employed, the only product of partial oxidation is benzaldehyde, the accompanying formation of acid being negligible.

The above comparison of the catalytic action of oxides of the fifth and sixth groups on various aromatic hydrocarbons which are typified by a benzene nucleus, in which aromatic hydrocarbons aliphatic side chains are substituted, indicates a vast difference between vanadium oxide and the other oxides of the fifth and sixth groups. It is seen that such oxides as those of molybdenum, uranium, tungsten and tantalum exert their catalyzing influence practically entirely in the direction of aldehyde formation, involving only the aliphatic side chain, and it is to be likewise pointed out that if a plurality of aliphatic side chains are present, only one of the groups undergoes selective oxidation to the aldehyde, the production of the di- or tri-aldehydes being nil. On the other hand, vanadium oxide is characterized by its ability to carry the selective oxidation of the aliphatic side chain beyond the aldehydic group and even to disrupt the aromatic nucleus itself, forming partial oxidation products from the latter. For example, if there are two aliphatic groups, ortho to each other, in the same benzene nucleus (e. g. ortho-xylene) the oxidation with vanadium oxide produces an aromatic ortho-dicarboxylic acid (e. g. phthalic acid) rather than stopping at the intermediate production of an aromatic ortho substituted monocarboxylic acid (e. g. ortho-methyl-benzoic acid) while if the aliphatic groups occupy the meta or para positions to each other (e. g. meta or para-xylene) the oxidation, as far as the side chains are concerned, stops at the corresponding aromatic substituted acids (e. g. meta or para-toluic acid). Of course, some aldehyde is produced in all cases with vanadium oxide, but this is relatively quite small when compared with the acid formation. But as stated previously, the catalytic oxidation with vanadium oxide does not stop with the partial or selective oxidation of the aliphatic side chains but proceeds, to a very considerable degree, to split open the benzene ring or nucleus to form maleic anhydride. In cases of three methyl groups attached to the same benzene nucleus, the specific action of vanadium oxides is again demonstrated in that its oxidizing action is more vigorous than the other metals of the fifth and sixth groups. Almost no aldehydic products are formed and phthalic acid is produced in large quantity from pseudocumene. Mesitylene likewise gives substantially no aldehydic products, maleic acid being practically the only product of partial oxidation.

The production of phthalic anhydride from pseudocumene has a theoretical interest in view of the grouping of the three methyl groups, and can be explained by assuming that the three methyl groups are converted into the corresponding carboxyl groups and that by a simultaneous splitting off of one molecule of carbon dioxide from the 4 position carboxyl group phthalic acid results, which, under the conditions of the catalysis, immediately loses one molecule of water, thereby reverting to the anhydride.

The production of maleic acid may arise from the formation of the corresponding tricarboxylic acid which is unstable under the conditions of the experiment and splits off three molecules of carbon dioxide, thereby forming benzene which is immediately oxidized to maleic acid.

It is very obvious from the preceding description that the oxides of the fifth and sixth groups other than vanadium oxide are practically exclusively aldehyde-forming catalysts, while vanadium oxide is more of an acid-forming catalyst. It has been found that these aldehyde-forming oxides do not give the same percentage yields, but the important phenomenon is that they are essentially aldehyde-forming catalysts which differentiate them from vanadium oxide.

In carrying out this invention the hydrocarbon is vaporized in any convenient way and is mixed in suitable proportions with an oxygen-containing gas. For this purpose air may be used, or pure oxygen, or ozone, or a mixture of any or all of these, or other gases which contain free oxygen together with a certain amount of blanketing or diluent gases or steam, in order to facilitate the control of the rapidity or completeness of the oxidation, may be beneficially employed. It is desirable that the hydrocarbon vapors should be mixed with an amount of oxygen-containing gas at least sufficient to satisfy the theoretical requirement for aldehyde formation, as indicated for example in the equation:

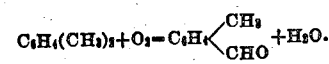

The catalysts may be prepared by depositing a salt of the metal or other water soluble compound of the metal on a suitable carrier, such as pumice, asbestos, etc., and igniting the deposited material to the oxide of the metal.

The previously described mixture of hydrocarbon vapor and oxygen-containing gas is then passed through the catalyst, which is preferably introduced into tubes or containers. The reaction is found to take place most satisfactorily at temperatures ranging between 300° and 700° C., which temperature is dependent, however, on the hydrocarbon in question, the speed of the hydrocarbon-gas mixture through the catalyst, namely, the length of time a molecule of the gas is permitted to remain in contact with the catalytic zone, the ratio of hydrocarbon vapor to oxygen-containing gas, and also on the particular catalyst employed.

After the products of reaction have passed out of the reaction zone, the condensable portions of the same are condensed and separated in the usual manner for the recovery of the aldehyde, while the uncondensed gases may be permitted to escape. Any unchanged hydrocarbon may be again passed through the reaction zone, such hydrocarbon having been enriched with oxygen-containing gas when necessary before recirculating it through the reaction zone.

The following examples will serve to further illustrate the manner in which these catalytic processes are carried out and also the relative activities of the various metallic oxides, but it is the intention not to be limited to these particular examples, as the proportions, temperatures and catalysts can be varied over wide limits, and although only the homologues of benzene have been mentioned, this invention is intended to cover other substituted aromatic nuclei, such as naphthalene, anthracene, etc., and their halogenated derivatives.

The yields stated below are based on the proportion of aldehyde obtained to the hydrocarbon oxidized.

*Example 1. Ortho-xylene.*—A mixture of air and ortho-xylene in the proportion of 7.3 parts of air to 1.0 part of ortho-xylene by weight is passed through a molybdenum catalyst heated to a temperature of 600° C. at a speed equivalent to a time of contact of 0.39 second. A yield of o-toluic aldehyde of about 50% is obtained. The acid production is negligible.

*Example 2. Meta and para-xylene.*—A mixture of air and meta and para-xylene vapor in the proportion of 3.24 parts of air to 1.0 part of the meta and para-xylene mixture by weight is passed through a uranium oxide catalyst and the catalyst heated to 450° C. With a time of contact of about 0.30 second a yield of the corresponding mixture of meta and para-toluic aldehydes of approximately 32% is obtained. Practically no toluic acid or other acid was produced.

*Example 3. Pseudo cumene.*—A mixture of air and pseudocumene vapor in the proportion of 8.3 parts of air to 1.0 part of pseudocumene by weight is passed through a tungsten oxide catalyst heated to 550° C. With a time of contact of 0.30 second a yield of dimethyl benzaldehyde (1:2 dimethyl :4 aldehyde) of 35% results. The production of phthalic acid is practically negligible.

*Example 4. Mesitylene.*—When a mixture of air and mesitylene vapor, in the proportion of 8.3 parts of air to 1.0 part uranium oxide catalyst at 350° C. at a speed equivalent to a time of contact of 0.38 second is used, a yield of dimethyl benzaldehyde (1:3 dimethyl :5 aldehyde) of about 20% is obtained. Practically no phthalic or maleic acid is obtained.

*Example 5. Para-cymene.*—A mixture of air and para-cymene vapor in the proportion of 3.5 parts of air to 1.0 part of para-cymene is passed through a uranium oxide catalyst at 450° C. at a speed equivalent to a time of contact of 0.33 second. A yield of p-toluic aldehyde of 17% is obtained along with an extremely small production of para-toluic acid.

*Example 6.—Ortho-chlortoluene.*—A mixture of air and ortho-chlortoluene vapor in the proportion of 6.3 parts of air to 1.0 part of ortho-chlortoluene by weight is passed through a tantalum oxide catalyst at 500° C. at a speed equivalent to a time of contact of about 0.31 second. A yield of o-chlorbenzaldehyde of 63% is obtained with only an extremely small amount of maleic acid and no o-chlorbenzoic acid.

I claim:—

1. The process of producing an aldehyde which comprises passing, in the vapor phase, 1 part pseudocumene and approximately 8.3 parts air by weight into contact with a metallic oxide, other than vanadium oxide, of the fifth and sixth periodic groups, at a temperature of approximately 550° C.

2. The process of producing an aldehyde which comprises passing, in the vapor phase, pseudocumene and an oxygen-containing gas into contact with a metallic oxide, other than vanadium oxide, of the fifth and sixth periodic groups, at a temperature of approximately 550° C.

3. The process of producing an aldehyde which comprises passing, in the vapor phase, pseudocumene and an oxygen-containing gas into contact with a metallic oxide, other than vanadium oxide, of the fifth and sixth periodic groups, and maintaining said contact for about 0.3 of a second at a temperature of approximately 550° C.

In testimony whereof I affix my signature.

AUGUSTUS E. CRAVER.